INVENTORS.
KAUNO E. SIHVONEN
ALBERT W. FISCHER
BY
Christie, Parker & Hale
ATTORNEYS.

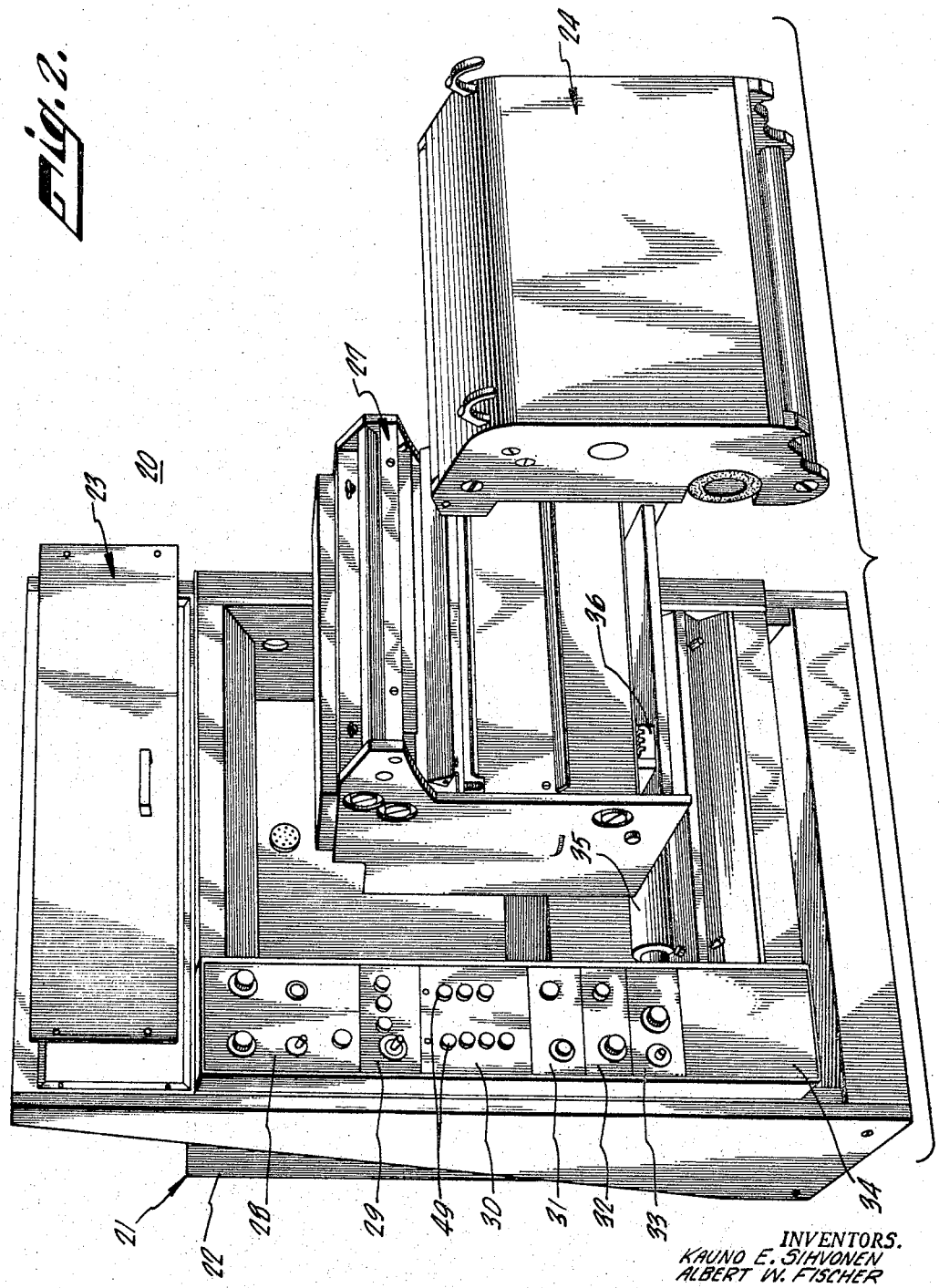

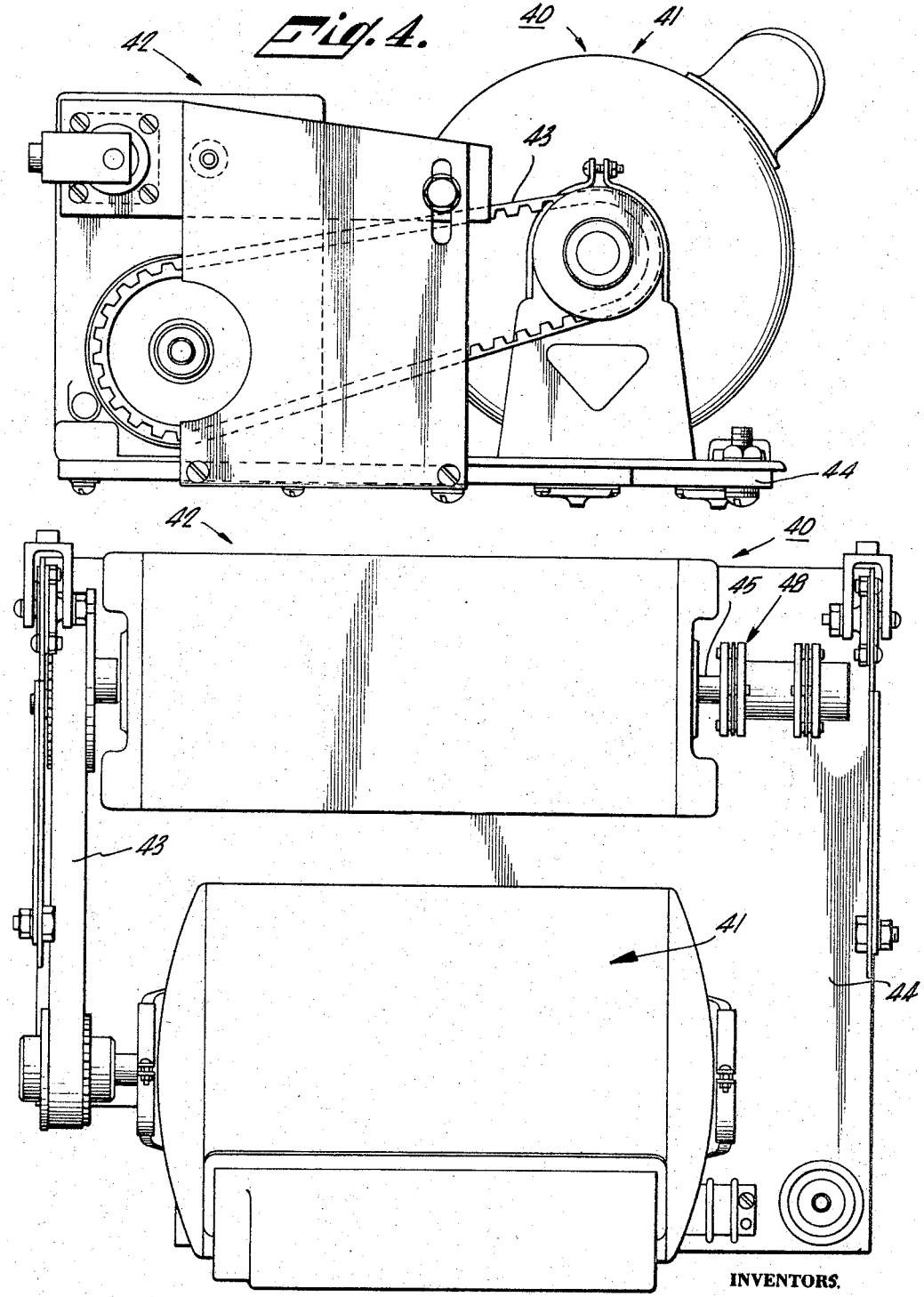

INVENTORS.
KAUNO E. SIHVONEN
ALBERT W. FISCHER
ATTORNEYS.

INVENTORS.
KAUNO E. SIHVONEN
ALBERT W. FISCHER 3,333,276
RECORD EVENT NUMBERING MODULE FOR MODULAR OSCILLOGRAPH
Kauno E. Sihvonen, Arcadia, and Albert W. Fischer, La Jolla, Calif., assignors to Consolidated Electrodynamics Corporation, Pasadena, Calif., a corporation of California
Original application Sept. 20, 1960, Ser. No. 57,289, now Patent No. 3,186,000, dated May 25, 1965. Divided and this application May 17, 1965, Ser. No. 456,408
2 Claims. (Cl. 346—107)

This application is a division of application Ser. No. 57,289, filed Sept. 20, 1960, for Modular Oscillograph, and issued May 25, 1965, as United States Patent 3,186,000. This application is directed to the record event numbering module described in said application and patent. The patent provides a more exhaustive description of the oscillograph than is here presented and is therefore referred to as a supplement to the following description.

This invention relates to oscillography, and, more particularly, to an improved record event numbering module for an oscillograph whose components are modularized.

An oscillograph, that is, an apparatus for producing a graphic record representing the instantaneous values of a varying electrical quantity as a function of time, is an extremely complex instrument. The oscillograph consists basically of a galvanometer connected to an electric quantity source, and recording means adapted to produce a graphic record in response to the actuation of the galvanometer by the electric quantity. Modern oscillographs utilize a light beam reflected from a galvanometer mirror onto photosensitive recording material to produce the graphic record of the electric function, thereby providing a recording system which is inertialess with the exception of the galvanometer. Drive means are provided to move the photosensitive recording material, usually in the form of a roll of paper, past the recording light beam. Various systems for developing the recorded image on the photosensitive paper have been utilized, with the current objective of such developments being to render the image visible as soon as possible after recording. By the use of a roll of photosensitive paper, a method for providing a continuous record of the electric function is provided. Various control circuits conventionally are included in the oscillograph in order to give some versatility to the operation.

The oscillograph is a comparatively expensive device. In order to reduce the cost of such oscillographs, it has been the practice, in the past, to standardize the features offered in a particular apparatus, so as to permit the economy of assembly-line manufacture. However, this practice has resulted in the inclusion of features for which a particular purchaser may have no need. These features are purchased since it is more economical to include them in the apparatus as marketed, than to construct a customized oscillograph for the individual purchaser. Alternatively, a purchaser will often need a number of oscillographs, but will have a need of utilization of the oscillographs such that only a limited number of complex instruments are required, simple instruments ordinarily sufficing. However, the complex instruments may be required at different locations at various times. The purchaser must then either select all of his instruments to include the complex features required only occasionally or must transport a single instrument having these features to the various locations as required and substitute less complex instruments when these features are not required. In either case, the end result is that the purchaser is put to additional expense, both in time and in equipment, in order to meet his oscillographic needs.

According to the present invention, an oscillograph is divided into sub-assemblies which are modularized; that is, self contained and dimensionally standardized. These sub-assemblies are interchangeable between instruments and enable an oscillograph to be assembled for the particular application required. The modules (i.e., the dimensionally standardized sub-assemblies) include the oscillographic mechanisms themselves and the control circuits. Thus, modules for a drive power source, a recording mechanism, a paper transport mechanism, and galvanometer input connections are included in a housing for the oscillograph. The housing also contains the appropriate control modules which include, for example, a paper transport speed control module, a light recording intensity control module, an on-off control module and an automatic recording length control module. Because of the novel concept of the invention, i.e., modularization of the oscillograph, the individual modules have novel structures themselves.

Generally speaking, this invention provides an event numbering mechanism for recording an event number on a recording medium passing through an oscillograph. The mechanism includes a first numbering member having transparent portions corresponding to a preselected progression of numbers commencing with zero. A second numbering member is also provided and has transparent portions corresponding to a second preselected progression of numbers. The mechanism also includes a source of illumination and means for causing illumination from the source to fall upon one set of numbers of each of the numbering members. Means are provided for disposing the numbering members relative to the source of illumination so that light from the source falls on the members to form a composite number which indicates an event number. The mechanism also includes means for initiating a first predetermined amount of displacement of the first numbering member in response to the occurrence of each event to be numbered so as to cause the first numbering member to sequentially display its progression of numbers as a portion of the composite number. The mechanism further includes means for initiating a second predetermined amount of displacement of the second numbering member upon completion of the cycling of the first numbering member through its progression of numbers.

The invention may be more readily understood by referring to the accompanying drawings in which:

FIG. 2 is an exploded perspective view of the oscillograph of FIG. 1;

FIG. 3 is a plan view of the drive and transmission module for the oscillograph of FIG. 1;

FIG. 4 is a side elevation of the module of FIG. 3;

FIG. 7 is a detail sectional view of a portion of the record event numbering assembly;

Figure 1:
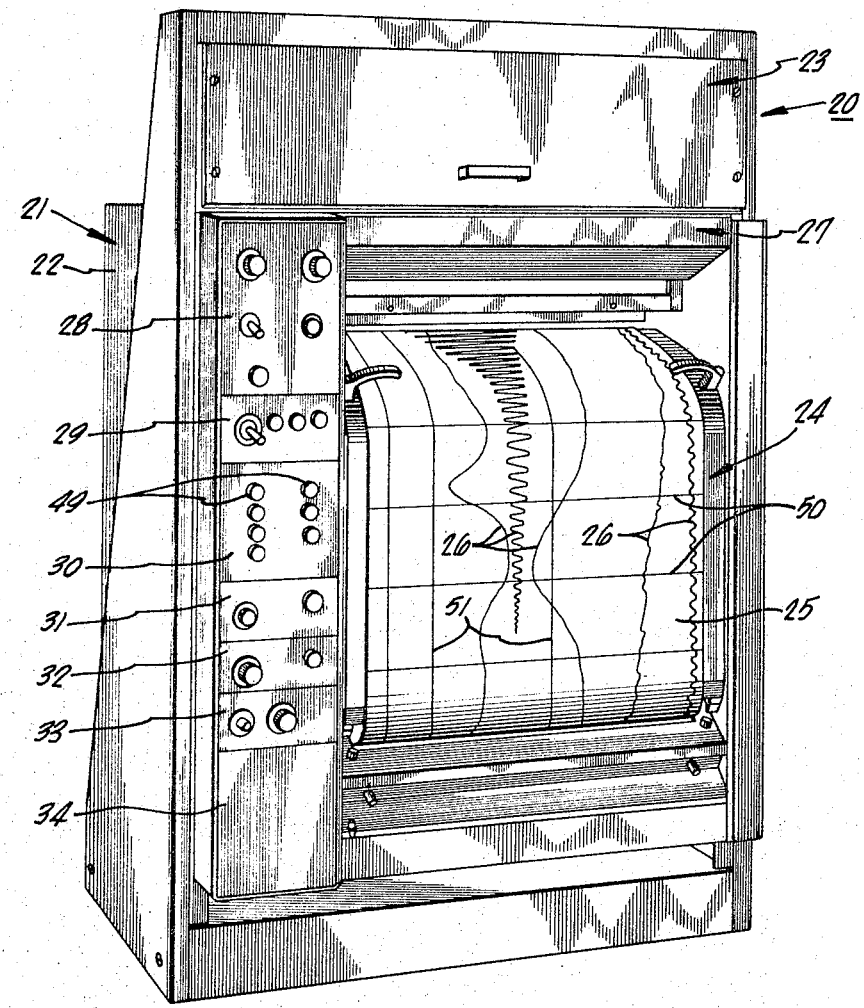
FIG. 1 is a perspective view of a modular oscillograph according to the invention.

Referring now to FIG. 1 there is shown a view in perspective of a modular oscillograph 20 according to the invention. The modular oscillograph has a housing 21 which holds a chassis 22 mounting various modules of the oscillograph. An input module 23 contains input connections to which are connected the various electric functions to be recorded. A paper transport module 24 has recording paper 25 being transported across the open side thereof. The paper has thereon various graphic representations 26 of varying electric functions. An optical module 27, only a portion of which is visible in FIG. 1, is contained within the chassis behind the paper transport module. Various control modules including a recording intensity module 28, a power on-off module 29, a paper transmission speed module 30, an operate-standby module 31, a timing control module 32, and an automatic record length module 33, are included. A blank section 34 permits the inclusion of additional control modules as may be required. A drive transmission module is included in the oscillograph, but being mounted in the rear portion of the oscillograph is not visible in FIG. 1.

FIG. 2 is an exploded view of modular oscillograph 20 showing input module 23, paper transport module 24, and optical module 27 separated from the chassis of the oscillograph. The control modules 28–33 remain in the positions shown in FIG. 1. A drive roller 35 in chassis 22 is utilized in connection with an idler roller (not shown) to provide the tension required to unwind the recording paper from the paper roll (not shown) contained within the paper transport module. Optical module 27 contains a bank of galvanometers (not shown) to which are connected the electric functions to be recorded. Connecting wires (not shown) extend from input module 23 to galvanometer assembly blocks 36 to make a direct connection between each input and the associated galvanometer. An optical module power connector 37 in chassis 22 connects to an optical module connector (not shown) of the optical module.

FIGS. 3 and 4 depict a drive and transmission module 40. The drive and transmission module consists of a motor 41 and a transmission assembly 42 connected together by means of a drive belt 43. Motor 41 and transmission 42 are each mounted on a base plate 44 which serves as the base of the module. The motor may be, for example, any conventional electric motor. However, the transmission assembly is preferably the novel transmission assembly shown in FIGS. 5 and 6 of Patent 3,186,000 and described therein. The transmission assembly has an output drive shaft 45 connected to a coupling 46 of a main drive gear assembly 48 (see FIG. 10). The transmission assembly is so constructed that it provides several output speeds of shaft 45 for a constant speed input to the transmission assembly from motor 41. The desired speed of rotation of the output shaft is selected and controlled by depression of suitable combinations of buttons 49 in transmission speed control module 30.

Optical module 27 is mounted to chassis 22 so that it cooperates with the transport module to produce latensifiable images of the variations with time in the electrical functions defined by the signals applied to the galvanometers in the optical module. The images are formed on a strip of light sensitive recording medium or paper moved through the transport module. The transport module is releasably mounted to the oscillograph chassis so that a writing roller of the transport module has its surface disposed at the focal point of the optical module output focus lenses. The transport module is described in Patent 3,186,000, and in application Ser. No. 456,409, filed May 17, 1965, as a division of the application upon which Patent 3,186,000 was issued.

Optical module 27 is described and claimed in Patent 3,186,000. As shown in this patent, the optical module includes a light source and a plurality of galvanometer blocks 36, each of which includes several galvanometers. Each galvanometer includes a mirror as a part of its movement. Light is directed along a predetermined path in the optical module from the light source to the mirrors, and the light reflected from the mirrors emerges from the optical module via focusing lenses. The focal point of the focusing lenses lies on the surface of the recording paper passing over the writing roller of the transport module. Accordingly, graphic representations or traces 26 of the time variations of the signals applied as oscillograph inputs are recorded on the paper and extend generally along the length of the paper.

As described in Patent 3,186,000, the optical module also includes mechanisms by which abscissa lines 50 (see FIG. 1) extending transversely of paper 25, and ordinate lines 51 extending along the paper, are recorded on the moving paper.

Figures 5, 6:
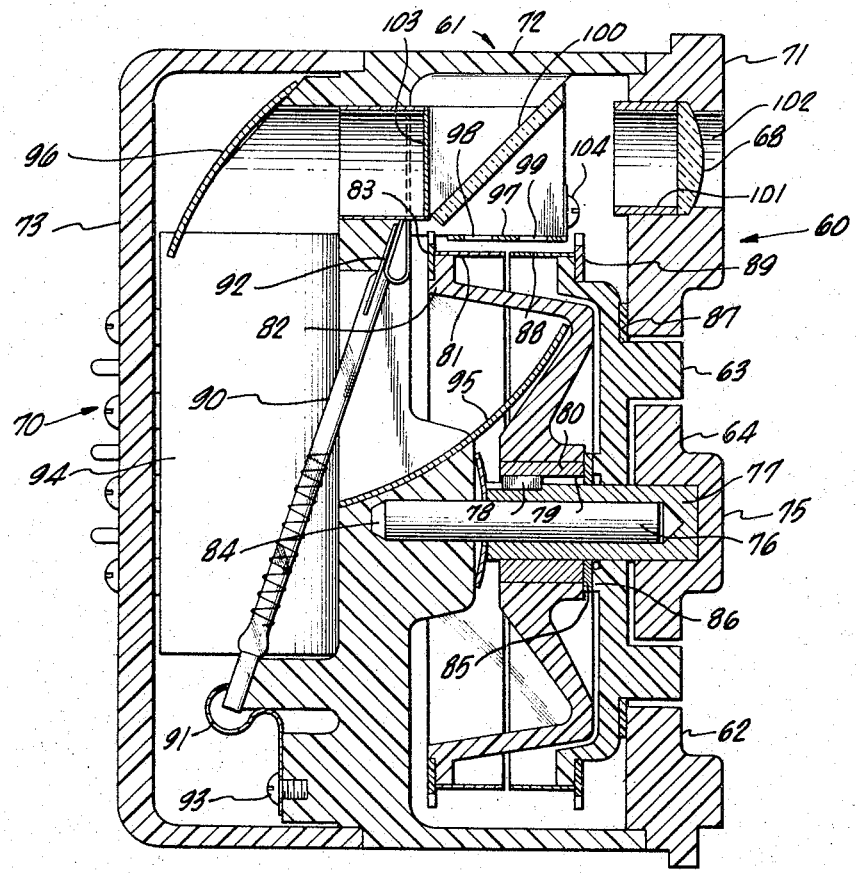
FIG. 5 is a front view of a record event numbering assembly.
FIG. 6 is a sectional side elevation of the record event numbering assembly taken along lines 6—6 of FIG. 5.
Figure 1:
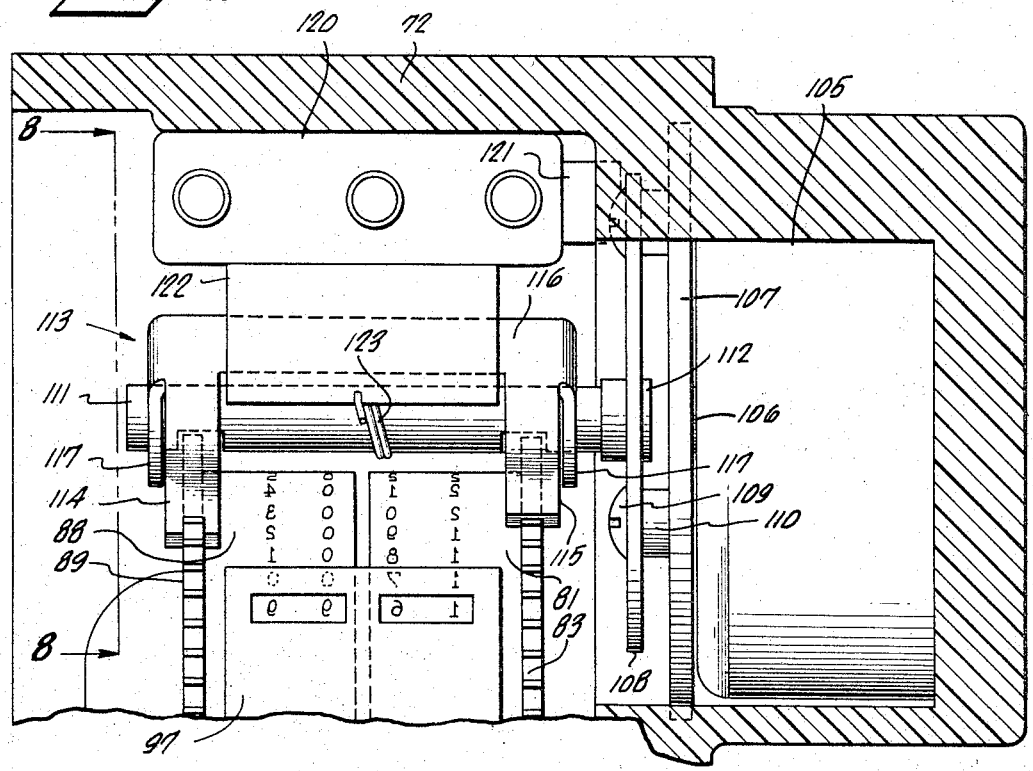

Referring now to FIG. 5, a front elevation of an event numbering assembly 60 is shown. The event numbering assembly includes an outer shell 61 having a recess 62 therein, within which are disposed a tens dial aligning knob 63 and a hundreds dial aligning knob 64. An aligning protrusion 65 in recess 62 is aligned with an aligning protrusion 66 of the tens dial aligning knob and an aligning protrusion 67 of the tens dial when it is desired to set the event numbering assembly to zero. A convex lens 68 is held in an aperture in shell 61 and is utilized to project the event number from the assembly onto the recording medium. A pair of bolts 69 are utilized to hold the assembly together.

FIG. 6 is a sectional view of event numbering assembly 60 taken along lines 6—6 of FIG. 5. A set of electrical terminals 70 are shown as disposed on the opposite side of the assembly from the side shown in FIG. 5. Shell 61 consists of a face portion 71, an intermediate portion 72, and a terminal attaching portion 73, to which the terminals are attached. Hundreds dial 64 includes a knob portion 75, which is mounted to an axle 76 by a connecting assembly 77. The connecting assembly includes a key 78 adapted to engage a slot 79 in a hundreds dial attaching ring 80. A hundreds dial 81 is attached to hundreds dial attaching ring 80 by an attaching arm 82. A hundreds dial ratchet 83 is attached to hundreds dial 81 and the attaching arm. Axle 76 is mounted in the intermediate shell portion in a recess 84 thereof, so as to be rotatable therewithin. Thus, the hundreds dial may be rotated by rotating knob portion 75.

Tens dial aligning knob 63 is rotatably mounted on the assembly attaching portion and spaced from the hundreds dial attaching arm by washers 85 riding against a shoulder 86. The tens dial aligning knob is spaced from the shell portion by a washer 87. A tens dial 88 and a tens dial ratchet 89 are attached to the tens dial knob.

A flash lamp 90 is held in place within intermediate portion 72 by a pair of electrical contacts 91, 92. The electrical contacts are connected to terminals 70 by connecting leads (not shown). Electrical contact 91 is held in position by a bolt 93 which engages intermediate portion 72. The circuit (not shown) utilized to flash lamp 90 is of conventional design and includes a charging capacitor 94.

Light from lamp 90, when flashed, falls on an event number mirror 95 and an equipment identification mirror 96. The light reflected from the event number mirror passes through attaching arm 82 (which is made of transparent or translucent material) and falls upon hundreds dial 81 and tens dial 88. The hundreds dial and the tens dial have transparent portions therein which correspond to Arabic numbers. The light passing through these transparent portions falls on a number shield 97. The number shield has a hundreds dial number selecting aperture 98 and a tens dial number selecting aperture 99 through which the light passes and falls on a reflecting mirror 100 in a disposition indicating the vent number. This light is reflected from the reflecting mirror through convex lens 68, which is shown as held in the shell portion by an annular fitting 101 so that the image passes through an aperture 102 in shell portion 71 and falls on the recording medium to form an image of the event number. Thus, the event which occurs at the instant lamp 90 is flashed, and which is represented by the pattern or shape of the curve defined by a respective one (or ones) of traces 26 recorded on paper 25, is given its own identifying number so that the record obtained by operation of oscillograph 20 can be interpreted more readily. Also, the recording of event numbers on the paper permits rapid location of the graphic representations of any events which may be of particular interest.

The light reflected from the equipment identification mirror passes through intermediate portion 72 and falls on an equipment identification plate 103. The equipment identification plate has transparent portions which correspond to the serial number of the equipment and arrows indicating the direction of travel of the recording medium and the instant of event recording. The light passing through these transparent portions passes by mirror 100 and through convex lens 68, then falls on the recording medium so as to provide a ready identification of the record when subsequently viewed. The tens and hundreds aperture forming plate 97 is held in position by a bolt and washer combination 104 which engages intermediate portion 72 of event numbering assembly 60.

Referring now to FIG. 7, there is shown the structure utilized to position hundreds dial 81 and tens dial 88 in the proper position in accordance with the number of the event. A solenoid 105, of the type which rotates a shaft 106 upon actuation, is disposed within the intermediate portion. The shaft is connected to a circular plate 107, to which, in turn, is attached a triangular plate 108 by means of three attaching bolts 109 and standoff lugs 110. The triangular attaching plate is axially centered with respect to the shaft. An axle 111 is connected to the triangular plate by means of a bushing 112 which is disposed to one side to the triangular plate so the axle is eccentrically positioned with respect to the shaft. Thus, when the solenoid is actuated, the axle is displaced laterally, rather than being solely angularly displaced. An actuating pawl assembly 113, consisting of a first pawl 114 and a second pawl 115, connected together by a central connecting portion 116, is connected to the axle by a pair of attaching lugs 117, which enclose the axle. The pawls engage ratchets 83 and 89, respectively.

A snap action switch 120 has a switch arm 121 extending therefrom, so as to be engageable with one of bolts 109 when the solenoid is actuated. The snap action switch is utilized to actuate flash lamp 90 which was described with respect to FIG. 6. The snap action switch has attached thereto a biasing arm 122, which engages one end of a biasing spring 123. The biasing spring is disposed about axle 111 and is utilized to bias pawls 114 and 115 so as to urge the pawls against ratchets 83 and 89.

Figure 8:
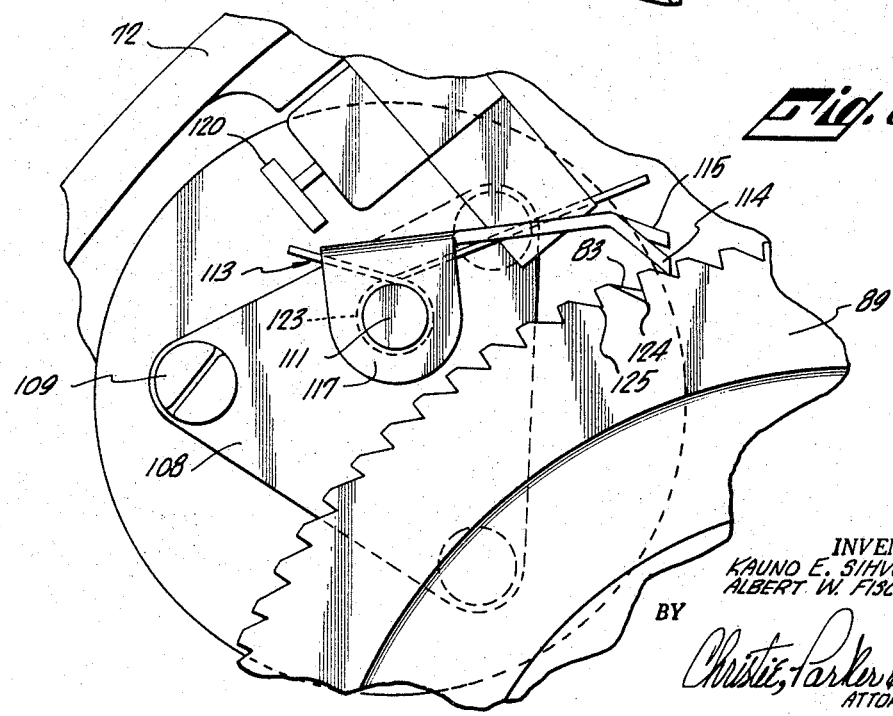
FIG. 8 is a detail sectional view of a portion of the record event numbering assembly.

FIG. 8 is a partial section taken alone line 8—8 of FIG. 7, and illustrates the disposition of ratchets 83 and 89, triangular plate 108, snap action switch 120, arms 121–122, pawl assembly 113, and bias spring 123, when solenoid 105 is in its deactuated position. Tens dial ratchet 89 is seen to have one tooth 124 which is deeper than the remainder of the teeth. It will be noted that tens dial pawl 114 engages tens ratchet while hundreds dial pawl 115 is retained above hundreds dial ratchet 83, due to the greater angle of inclination of pawl 114. However, when pawl 114 engages deeper tooth 124, the hundreds dial pawl engages ratchet 83. The actuation of solenoid 105 causes the clockwise movement of the pawl assembly. Pawl 114 thus forces ratchet 89 to move clockwise upon the actuation of the solenoid. Upon deactuation of the solenoid, pawl assembly 113 moves in a counterclockwise direction to the position shown in FIG. 8. Thus, with respect to the disposition shown in FIG. 8, after the next succeeding actuation of the solenoid, pawl 114 will ride in ratchet tooth 124, thus enabling pawl 115 to engage ratchet wheel 83. Such a disposition is shown in FIG. 9.

Figure 9:
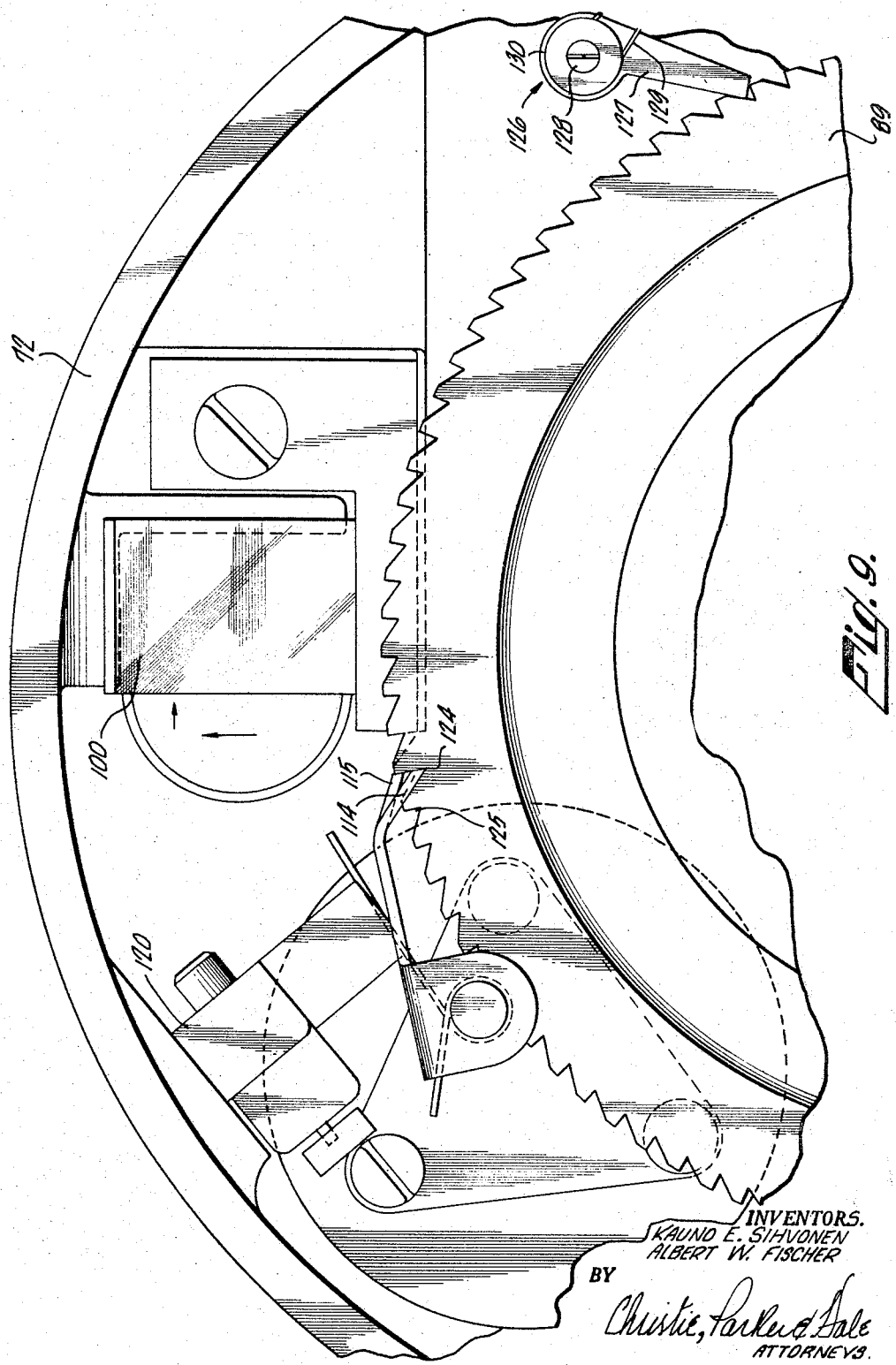
FIG. 9 is a detail sectional view of a portion of the record event numbering assembly.

In FIG. 9, pawl 114 engages ratchet tooth 124, permitting pawl 115 to engage ratchet 83. Subsequent to the engagement of pawl 114 with ratchet 83 shown in FIG. 8, solenoid 105 has again been actuated. The pawl assembly is thus moved clockwise, and pawl 114 forces the clockwise movement of ratchet 89. When the solenoid is deactuated, the pawl assembly moves counterclockwise and pawls 114 and 115 engage ratchets 83 and 89. Actuation of the solenoid then causes pawls 114 and 115 to move both ratchets 83 and 89 clockwise, so as to advance both dials 81, 88. The deactuation of the solenoid causes pawl 114 to engage a tooth 125 in ratchet 89. Tooth 125 is of a short depth, and thus pawl 115 is unable to engage hundreds ratchet 83. In order to maintain ratchets 83 and 89 and thus the hundreds dial 81 and tens dial 88 in the positions set by pawl assembly 113, a dual stop pawl assembly 126 is utilized. The dual stop pawl assembly includes a pair of stop pawls 127, only one of which is shown in FIG. 9. Each of the stop pawls engages one of ratchets 83, 89. The stop pawls are mounted on an axle 128, and are contacted by a torsion bias spring 129, which is operable to urge pawls 127 against ratchets 83, 89. Bias spring 129 is held in position by an end plate 130. Thus, ratchets 83, 89 are free to move in a clockwise direction in response to such urging by pawl assembly 113, but are prevented from moving in a counterclockwise manner by the engagement of pawls 127 with the teeth of respective ratchets 83, 89. Each time solenoid 105 is actuated the tens dial ratchet moves the tens dial to display the next succeeding number on the dial. However, the hundreds dial is only moved at such times as a deeper tooth 124 occurs in tens dial ratchet 89. These teeth are spaced so as to occur at every one hundredth tooth, and thus a counting function is provided, whereby the hundreds dial is moved to indicate the next one hundred number once for each hundred actuations of the solenoid.

As shown in Patent 3,186,000, and especially in FIG. 22 thereof, oscillograph 20 includes an automatic record length control module which may be operated to control the amount of paper run through the oscillograph before the machine shuts itself off. This mechanism can be left unoperated when an indeterminant length of paper is to be used. The record length control mechanism includes a rotatable cam which is driven from a gear mounted to the shaft of driven paper metering roller 35 (see FIG. 2). The cam is engaged with a switch which is operated by the cam every time roller 35 completes a predetermined number of rotations. Operation of this switch provides the signal which controls the operation of solenoid 105, the operation of which controls the operation of flash lamp 90 via switch 120. Since the cam is coupled directly to roller 35, the operation of lamp 90 is assured whether or not the record length control module is actuated to control the amount of paper passed through the oscillograph. To the extent that the disclosure of Patent 3,186,000 is required to acquaint those skilled in the art with the utility and operation of the record event numbering module described above, the patent is referred to and incorporated herein as though such portions thereof were fully set forth at this point.

Figure 10:
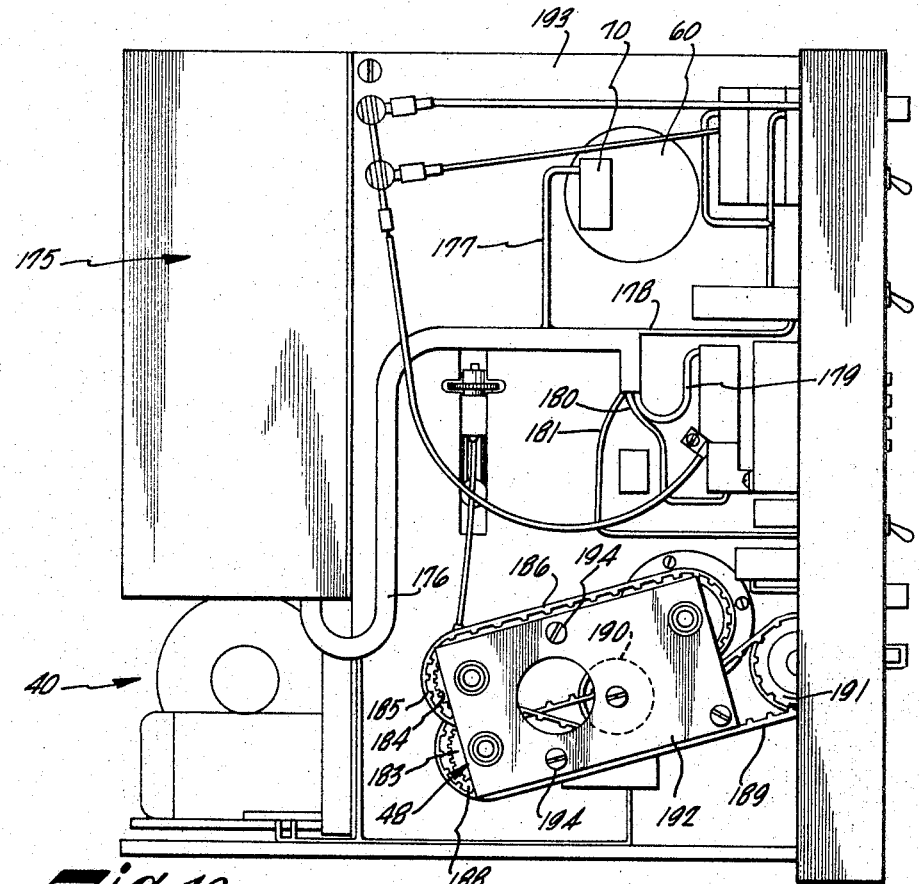
FIG. 10 is a side elevation of the modular oscillograph.

FIG. 10 is a side elevation of a modular oscillograph according to the invention. An electrical power supply module 175, which is of conventional construction and is designed as appropriate for the particular oscillographic operations to be performed, is connected to the oscillograph frame. An electrical power and control cable 176 extends from the electrical power module and has branches 177, 178, 179, 180, and 181, which are connected to the various modules and control circuits on the front panel assembly. Visible in FIG. 10 is the event numbering assembly 60 and the terminal board 70, thereof.

Also visible in FIG. 10 is the drive module 40. The transmission output shaft 45 is connected to a coupling 46 (see FIG. 3) to which a main drive gear assembly 48 is connected. The main drive gear assembly includes a tooth gear 183 which engages a tooth gear 184 attached to a take-up roller transfer pulley 185. A drive belt 186 extends between transfer pulley 185 and a take-up roller drive pulley 187. The drive pulley is attached to a magnetic clutch (not shown) which abuts the magnetic clutch of the take-up roller in the transport module (see application Ser. No. 456,409, filed May 17, 1965 as a division of the application which matured on May 25, 1965 into Patent 3,186,000). The main drive gear assembly includes a metering roller drive transfer pulley 188 which engages a belt 189. Belt 189 passes on one side about an idler roller 190 and engages a metering roller drive pulley 191 which is attached to the metering roller axle of the transport module. The pulleys 185, 187, 188 and 191, and idler roller 190 are held in position by a positioning plate 192 through which the gear axles extend. The positioning plate is fixed to chassis side plate 193 by a pair of bolts 194.

What is claimed is:

1. In a recording oscillograph adapted for recording on a moving light sensitive recording medium, by means of a movable light beam, a representation of the variations in the value of an input signal applied to the oscillograph, apparatus for recording on the medium numbers identifying events in the recorded representation comprising a first cylindrical dial member mounted for rotation about its axis and having transparent portions around its extent defining a first preselected progression of numbers commencing with zero, a second cylindrical dial member juxtaposed in coaxial relation to the first dial member and mounted for rotation about its axis and having transparent portions around its extent defining a second preselected progression of numbers, a flash source of illumination, means for directing light from the source along a first light path having a portion disposed radially outwardly of and through the dials, a lens disposed along the first path receiving light from the source via the dials, mask means along the first path between the source and the lens for passing to the lens only the light passing through those transparent portions of the dials which are aligned with each other along the first path between the source and the lens, the aligned transparent portions defining a composite number which indicates an event number, the lens being adapted for focusing an image of the composite number on the recording medium, means defining a second light path from the flash source to the lens, the second path having a portion operatively parallel to said portion of the first path, an identifying mask member disposed in the second path along said portion thereof and having transparent portions defining preselected information characters, means uniting the first and second light paths and combining the images of the preselected information characters with the image of the composite number for presentment of the combined images to the lens, means for indexing the first dial angularly an amount corresponding to the distance between successive numbers of the first progression in response to the occurrence of each event to be numbered so as to cause the respective numbers in the first progression to appear sequentially as a component of the composite number, means for indexing the second dial angularly an amount corresponding to the distance between successive numbers of the second progression in response to and on completion of the cycling of the numbers of the first progression past a given location so that the respective numbers of the second progression appear sequentially as a component of the composite number, and means operable upon each indexing of the first dial to cause the flash source of illumniation to emit light for a predetermined period of time.

2. Apparatus according to claim 1 including manually engageable means connected to each dial member operable for positioning the dial members to define a selected composite number adjacent the mask means.

References Cited

UNITED STATES PATENTS

| | | | |
|---|---|---|---|
| 1,584,296 | 5/1926 | Hohmann | 95—1.1 |
| 1,950,647 | 3/1934 | Bailer | 235—135 X |
| 2,490,338 | 11/1949 | Marin et al. | 95—1.1 |
| 3,066,299 | 11/1962 | Kampf | 346—109 |

RICHARD B. WILKINSON, *Primary Examiner.*

J. W. HARTARY, *Assistant Examiner.*